United States Patent [19]

La Bate

[11] 4,399,250

[45] Aug. 16, 1983

[54] MATERIAL FOR TREATING COKE OVEN DOORS AND JAMBS TO PREVENT THE BUILD UP OF TAR THEREON

[76] Inventor: Micheal D. La Bate, 115 Hazen Ave., Ellwood City, Pa. 16117

[21] Appl. No.: 318,760

[22] Filed: Nov. 6, 1981

Related U.S. Application Data

[63] Continuation-in-part of Ser. No. 181,123, Aug. 25, 1980, Pat. No. 4,316,831, which is a continuation-in-part of Ser. No. 49,349, Jun. 18, 1979, abandoned, which is a continuation-in-part of Ser. No. 905,513, May 15, 1978, abandoned.

[51] Int. Cl.$^3$ ............................................... C08L 23/00
[52] U.S. Cl. ...................................... 524/442; 106/83; 106/208
[58] Field of Search ..................... 524/442; 106/38.22, 106/83, 84, 208, 74

[56] References Cited

U.S. PATENT DOCUMENTS

| | | | |
|---|---|---|---|
| 2,807,552 | 9/1957 | Robinson et al. | 106/74 |
| 3,428,464 | 2/1969 | Pollard | 106/38.23 |
| 3,884,863 | 5/1979 | Beers et al. | 524/442 |
| 4,187,334 | 2/1980 | La Bate | 427/236 |
| 4,187,335 | 2/1980 | La Bate | 427/318 |
| 4,316,744 | 2/1982 | Bergna | 106/83 |

*Primary Examiner*—Lorenzo B. Hayes
*Attorney, Agent, or Firm*—Harpman & Harpman

[57] ABSTRACT

A material that is largely an aqueous solution of soluble silicates and a carboxylated resin is described that will form a lubricating adhesive coating on the coke oven doors and jambs which acts to prevent leakage of tar and other coke by-products and the resultant build up as heretofore common in the art and the resultant inability of maintaining a sealing relation between the doors and jambs.

2 Claims, No Drawings

4,399,250

MATERIAL FOR TREATING COKE OVEN DOORS AND JAMBS TO PREVENT THE BUILD UP OF TAR THEREON

This application is a continuation-in-part of my application Ser. No. 181,123, filed Aug. 25, 1980 U.S. Pat. No. 4,316,831, which was a continuation-in-part of my application Ser. No. 049,349, filed June 18, 1979 abandoned, which was a continuation-in-part of my application Ser. No. 905,513, filed May 15, 1978 abandoned.

BACKGROUND OF THE INVENTION (1) Field of the Invention

This invention relates to a material for treating coke ovens and the doors thereon to provide for the sealing of the doors with respect to the jambs during the coking operation.

(2) Description of the Prior Art

Coke ovens are provided at their opposite ends with self-sealing doors that depend on a metal to metal contact between the door and the continuous machined surface cast iron jamb.

In a typical example the sealing edge of the door is carried by a flexible frame and the door assembly includes a powerful spring between the door and the locking bar to force the sealing edge against the metal door jamb to prevent the escape of volatile products from the coke oven. Such door and jamb assemblies on the coke side and pusher side of the coke oven commonly fail to maitain a sealing metal to metal relation and tar and other by-products produced during the coking operation escape and build up between the door and jambs and must be manually removed each time the doors are removed and repositioned when the coke is pushed from the oven. The tar and by-products build up deposits which are difficult to remove and the removal is time consuming so that frequently the doors are repositioned and the desirable sealing relation to effect an efficient coking operation is adversely affected.

The present invention relates to a material for forming a penetrating and lubricating adhesive coating on the sealing edges of the doors and jambs that is not affected by the heat of the coking operation and to which tar and other by-products will not adhere with the result that the sealing edges of the doors and jambs which are engaged thereby remain clean and free of tar and other by-product build up and can effectively seal the coke oven.

The prior art comprises my U.S. Pat. Nos. 4,187,334 and 4,187,335, issued Feb. 5, 1980.

SUMMARY OF THE INVENTION

A material for treating coke oven doors and jambs to prevent the build up of tar and other coke oven by-products thereon, contains essentially an aqueous solution of soluable silicates in a liquid carrier with submicron sized particles of graphite, wherein the extremely fine size of the submicron sized particles of graphite lowers the surface tension of the liquid carrier and enables the soluable silicate to build up a smooth adhering surface coating with graphite particles penetrating the metal surfaces of the coke oven doors and jambs. The liquid carrier comprises water, an aqueous soluable silicate solution, hydrochloric acid and a water soluable resin such as a carboxylated polymer, for example carboxy polymethylene, or the like, carboxylic acids, either COOH or $CO_2H$ and/or composed of a carboxyl group and a hydroxyl group, carboxyl; oxatyl, carboxy, the acidic COOH group. The soluable silicate provides an effective lubricating and adhesive coating material when applied to the coke oven doors and jambs as by spraying the same thereon which will seal the same and prevent objectional emissions.

DESCRIPTION OF THE PREFERRED EMBODIMENT

The material of this invention this is particularly suitable for supplying a penetrating and lubricating adhesive coating to coke oven doors and jambs comprises substantially between 5% to 25% by weight submicron sized particles of graphite, between about 34% to 75% by weight of a solution of water and sodium silicate ($Na_2Si_3O_7$) wherein the sodium silicate is present at about 40% of the solution by weight, between about 2% and 10% concentrated hydrochloric acid of a 90% purity by weight, between about 33% to 75% of a solution of water and carboxy polymethylene polymer resin wherein the resin is present in amounts between 1% and 10% of the solution by weight.

The critical particle size of the submicron sized graphite particles being substantially amicron; less than 4 m$\mu$ or $10^{-7}$ CM as determined by electron microscopy. The submicron sized graphite particles are made by ball milling the finest mesh colloidal graphite particles commercially available for a time sufficient to obtain the desired submicron graphite particle size which eliminates the platelets. The carboxy polymethylene polymer resin powder has a specific gravity of 1.41 and a bulk density of 13 lbs. per cubic foot. It is available as "CARBOPOL" from B. F. Goodrich Chemical Co. and low concentrations mixed with water as herein disclosed produce a thin gel-like liquid with penetrating and adhesive qualities.

The liquid carrier as set forth hereinbefore comprises an effective wetting agent which contributes to the ability of the submicron sized particles of graphite to form a penetrating lubricating and adhesive coating in and on the coke oven doors and jambs.

Those skilled in the art will also observe that the percentage of the submicron sized particles of graphite and the materials in the liquid carrier may be widely varied depending upon the number of applications of the material to the metal parts being treated. For example small percentages of the submicron sized particles of graphite in the liquid carrier perform effectively when a number of applications of the material are applied and when only one or a few applications of the material are applied to the metal surfaces, a hgher percentage of the submicron sized particles of graphite are essential. In either case the material penetrates the metal surfaces being treated and builds up an extremely smooth, slick surface coating of excellent adherence to which the tar and by-products from the coke oven will not adhere or if some adherence occurs the adhering material may be easily removed by air or water or other fluid jets.

In using the material disclosed herein the process involves mixing the materials to form a liquid suspension of the submicron sized particles of graphite and the other materials and then spraying the same by any suitable spraying equipment on cleaned metal surfaces of the coke oven doors and jambs to be treated. One or more coatings are applied as necessary to build up the smooth unbroken surface of the material in and on the metal parts being treated and the material may be applied to the metal surfaces while they are either hot or cold.

The ability of the material to be applied to the hot metal surfaces is particularly advantageous in a coke oven operation as the doors are removed from the ovens to permit a pusher to move the coke from the ovens while the ovens themselves are maintained at or near coking temperatures.

Those skilled in the art will observe that the heretofore necessary manual cleaning of the doors and door jambs frequently required motorized buggies and similar mechanical equipment and the time of such cleaning is eliminated through the use of the material hereinbefore disclosed.

It will also be observed that the production of metallurgical coke is improved and stabilized by providing for the effective sealing of the coke oven doors made possible with the material herein disclosed.

It has been determined that other applications and uses of the material disclosed herein are possible and such may include the treating of forging dies in the hot forging of metals and the treatment of various metal handling and processing equipment wherein the surface condition of the metal treating equipment is desirably maintained in a smooth condition resisting adhesion or contaminates thereto.

Additionally ingot molds are advantageously treated with the material of the invention as such treatment expedites the stripping of ingots from the molds. The following specific examples of the material have been found satisfactory for the treatment of coke oven doors and jambs and like metal surfaces.

A. Substantially 8% by weight submicron sized particles of high purity synthetic graphite, substantially 7% by weight concentrated hydrochloric acid of substantially 90% purity, substantially 18% by weight water ($H_2O$), substantially 34% by weight aqueous sodium silicate solution wherein the $Na_2Si_3O_7$ is present at about 40% by weight of the solution and substantially 33% by weight of a solution of water and a water soluable carboxy polymethylene polymer resin as a powder wherein the resin is present at substantially 8% by weight of the solution.

B. Substantially 8% by weight submicron sized particles of high purity synthetic graphite, substantially 7% by weight concentrated hydrochloric acid of substantially 90% purity, substantially 18% by weight water ($H_2O$), substantially 67% by weight aqueous sodium silicate solution wherein the $Na_2Si_3O_7$ is present at about 40% by weight of the solution.

C. Substantially 67% by weight aqueous solution of a water soluable silicate, wherein the silicate is present at about 40% by weight of the solution, substantially 7% by weight concentrated hydrochloric acid of substantially 90% purity, substantially 18% by weight water, substantially 8% by weight of a water soluable carboxy polymethylene polymer resin as a powder wherein the resin is present at substantially 8% by weight of the solution so as to form a foam upon application to the coke oven doors and jambs.

It will be observed that the invention disclosed in this application is substantially the same as that disclosed in the parent application Ser. No. 181,123 with the exception that emphasis is now made of the material comprising primarily an aqueous solution of a soluable silicate such as sodium silicate or the like which will form a closely adhering filling and lubricating foam-like material upon application to the coke oven doors and jambs and thus enable the same to be effectively sealed during operation so as to prevent emissions of coal, tar and other coke by-products and the resultant build up as heretofore common in the art with the resulting inability of maintaining a sealing relation between the doors and jambs and the escape of the objectionable pollutants into the atmosphere.

The example C in this application discloses the use of the material of the liquid carrier comprising substantially 67% by weight of an aqueous solution of a water soluable silicate such as sodium silicate as set forth in the specification. The addition of the submicron sized particles of high purity synthetic graphite as set forth in examples A and B, enables the resulting product to have the dual characteristics of both forming the desirable adhering smoothing and sealing coating of the soluable silicates and the penetrating ability of the submicron sized particles of graphite. Examples of these materials are set forth hereinbefore in examples A and B.

The reference to soluable silicates is intended to include any of the widely occurring compounds containing silicon, oxygen, and one or more metals with or without hydrogen. The silicon and oxygen may combine with organic groups to form silicate esters, most rocks, except limestone and dolomite, and many mineral compounds are silicates. Typical natural silicates are gem stones, except diamonds, beryl, asbestos, talc, clays, feldspar, mica, etc. Portland cement contains a high percentage of calcium silicates.

Since the best known of the synthetic "soluable" silicates is sodium silicate (water glass) it has been used as the preferred example in this disclosure. It has been determined that it is also possible to prepare a desirable sealing, coating, adhesive material incorporating silicic acid, which is a hydrated silica. It has also been determined that silicone, which may be any of a large group of siloxane polymers based on a structure consisting of alternate silicon and oxygen atoms with various organic radicals attached to the silicon may be used. A commercial example of such material is "SILICLAD", which is a trademark for a water soluable silicon concentrate sold by Clay-Adams, Inc.

Although the embodiments of the present invention have been limited as described hereinbefore, it will be apparent to those skilled in the art that various changes and modifications may be made therein without departing from the spirit of the invention and having thus described my invention what I claim is:

1. A normally liquid suspension material for forming sealing and lubricating adhesive coatings on coke oven doors and jambs subjected to coke oven operating temperatures and comprising between about 34% to 75% of a solution of water and a soluble silicate wherein the soluble silicate is present at about 40% by weight of the solution, between about 2% to 10% concentrated hydrochloric acid of 90% purity by weight, between about 33% to 75% of a solution of water and a carboxy polymethylene resin wherein the resin is present in amounts between 1% and 10% of the resin solution by weight and withstands said coke oven operating temperatures so that the material will remain in place on the doors and jambs of an operating coke oven.

2. The liquid suspension material of claim 1 and wherein the soluble silicate is a solution of water and sodium silicate wherein the sodium silicate is present at about 40% of the solution.

* * * * *